FIP8102 XR 3,404,278 CROSS REFERENCE SEARCH ROOM

Oct. 1, 1968 H. R. CHOPE 3,404,278

RE-ENTRY COMMUNICATIONS SYSTEM AND METHOD

Filed Nov. 12, 1963 3 Sheets-Sheet 1

INVENTOR
HENRY R. CHOPE

BY William T. Fryer III

ATTORNEY

INVENTOR
HENRY R. CHOPE

BY William T. Fryer III

ATTORNEY

INVENTOR
HENRY R. CHOPE
BY William T. Fryer III
ATTORNEY 3,404,278
RE-ENTRY COMMUNICATIONS SYSTEM AND METHOD Henry R. Chope, Columbus, Ohio, assignor to Industrial Nucleonics Corporation, a corporation of Ohio
Continuation-in-part of application Ser. No. 125,797, July 21, 1961. This application Nov. 12, 1963, Ser. No. 322,671
5 Claims. (Cl. 250—199)

The present invention relates generally to the art of communications and is particularly concerned with the problem of space communications through a highly dense region of ionized gas to a remote location, normally a planet.

This application is a continuation-in-part of application Ser. No. 125,797, filed July 21, 1961, now Patent No. 3,123,714, entitled "Space Communication System."

Space communications is an area where much development is still needed. Take, for example, the problem of communications with a missile or space capsule, generally each referred to hereinafter as a space vehicle, reentering the atmosphere. The communications, at least to the planet, should not fail, because valuable data may be lost even during the four or five minutes during reentry. By space communications is meant the ability to transmit intelligence, either voice or instrument information, for example, between the space vehicle and a distant location usually a ground station on a planet.

Up to the present a space vehicle has been linked with a ground station via a radio-frequency transmitter carried in the space vehicle. However, during reentry of the space vehicle communications has been interrupted for as much as four minutes due to an ionized sheath or plasma built up around the space capsule. This highly dense region of ionized gas prevents ordinary electromagnetic energy from reaching a ground station.

It is an object of the present invention to provide a method and apparatus for space communications.

It is another object of the present invention to provide a communications method and apparatus that will serve to continuously link a space vehicle and a ground station during reentry.

It is a further object of the present invention to communicate through a region of highly dense ionized gas to a distant location.

These and other objects are achieved in accordance with the present invention by utilizing a method of communications that penetrates the highly ionized region and reaches any desired distant location. Briefly, an X-ray transmitter in the space vehicle generates a carrier beam that penetrates the highly ionized region formed during reentry. The beam is modulated in the space vehicle by an intelligence signal, such as the voice channel or by a pulse code like radio telegraph, for example. The modulated X-ray carrier beam is picked up on the other side of the highly ionized region at an intermediate location between the space vehicle and the planet where the intelligence signal is removed from the X-ray carrier beam and retransmitted over another communications means, such as by a radio transmitting system to the distant location. The apparatus may include several airborne relay stations disposed at the planned area of reentry that each contain a radio transmitting system for communications with a radio receiving system at the distant location.

The usefulness and operation of the present invention can be illustrated by a detailed description of a preferred embodiment, with reference to the attached figures, wherein, FIG. 1 is an elevation view of a conventional space capsule, partially broken open to show the astronaut and apparatus within the space capsule.

Figures 1, 2:
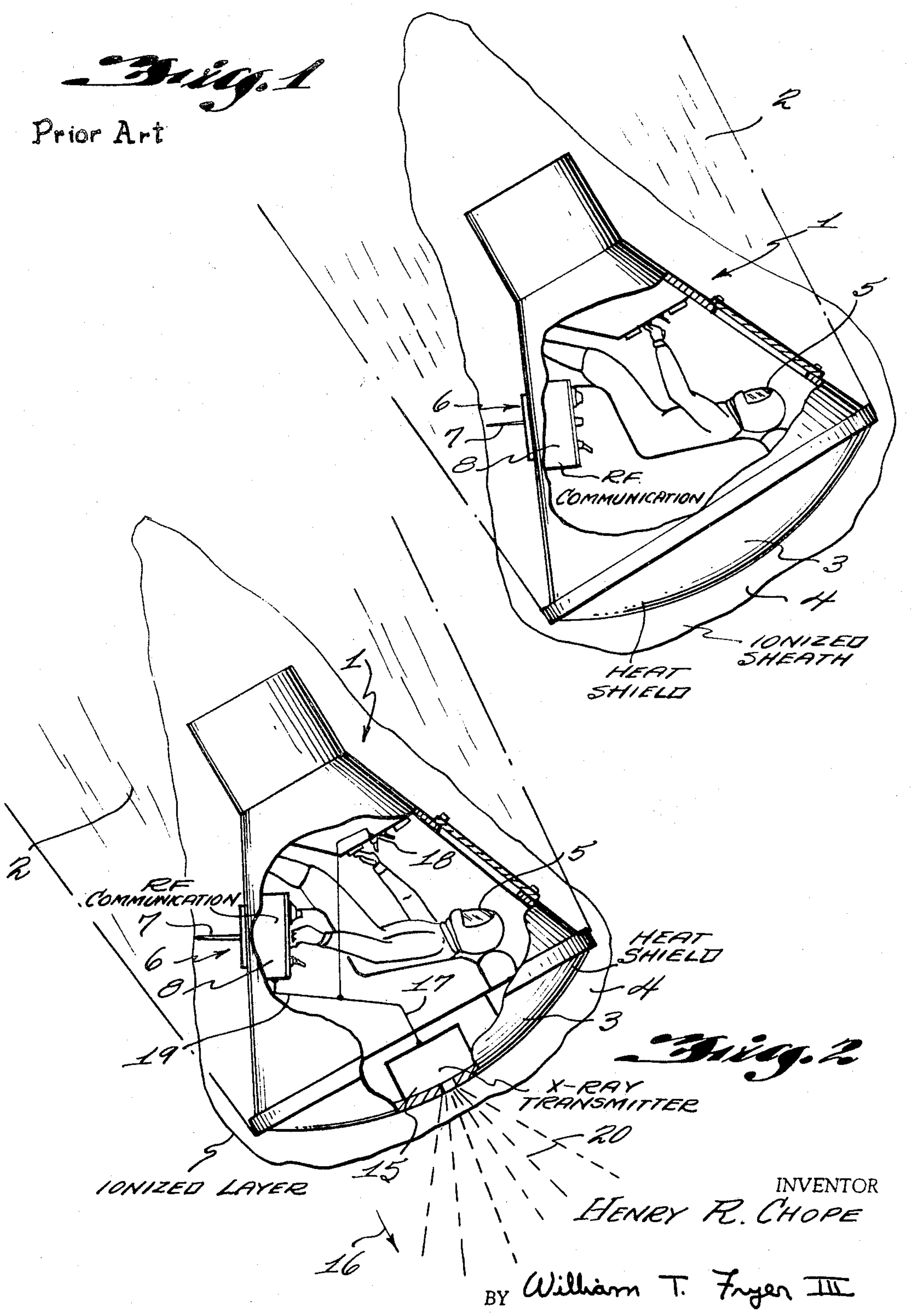
FIG. 2 is an elevation view of a space capsule partially broken open to show installation of an X-ray transmitter in accordance with the present invention.

The problem encountered in reentry communications has already been stated briefly. As the space capsule 1 (FIG. 1) reenters the atmosphere 2, the space capsule heat shield 3 is deployed in the reentry direction. The speed of the space capsule 1 is such that a highly compressed mass of air about the sapce capsule 1 ionizes to form a sheath 4. Inside the space capsule 1 the astronaut 5 and the telemeter systems have been communicating directly with the ground station, before reentry, via a radio transmitting system 6, comprising antenna 7 and transmitter 8. The ionized sheath 4 absorbs the radio energy from radio transmitting system 6 and communications are cut off during reentry.

To restore communications to a distant location, hereinafter called the ground station, for example only, during reentry, the method of the present invention employs the steps of passing a carrier beam of X-ray radiation from the space capsule 1 through the ionized sheath 4, modulating the X-ray beam before transmission through the ionized sheath 4 with an intelligence signal, and receiving the modulated carrier beam after passing through the ionized sheath at an intermediate location and removing the intelligence from the modulated carrier beam. The removed intelligence is transmitted to the ground station via another communications means.

In the illustrated embodiment of the present invention (FIG. 2), an X-ray transmitter 15 is deposed in space capsule 1 behind the heat shield 3 to radiate a penetrative X-ray carrier beam 20 to outer space in the direction of reentry, identified by arrow 16. An intelligence signal is coupled to the X-ray transmitter 15 at input 17 from one or more of several sources, controlled by the astronaut 5 by a switch on the instrument panel 18. The same input is applied to the input 19 of the radio-transmitting system 6. The astronaut 5 can turn the X-ray transmitter 15 on and off, and just before and during reentry the radio transmitting system 6 and the X-ray transmitter 15 can be on.

X-rays are very penetrative and pass through highly dense regions with sufficient intensity to be received at a substantial distance from their source. The X-ray beam 20 passes through the ionized sheath 4 into space, radiating towards the ground station.

The X-ray beam 20 will not reach the ground station directly with any useful intensity. Accordingly, the present invention provides an airborne relay means with another communications system to demodulate X-ray beam 20 and retransmit the intelligence signal to the ground station.

Figure 3:
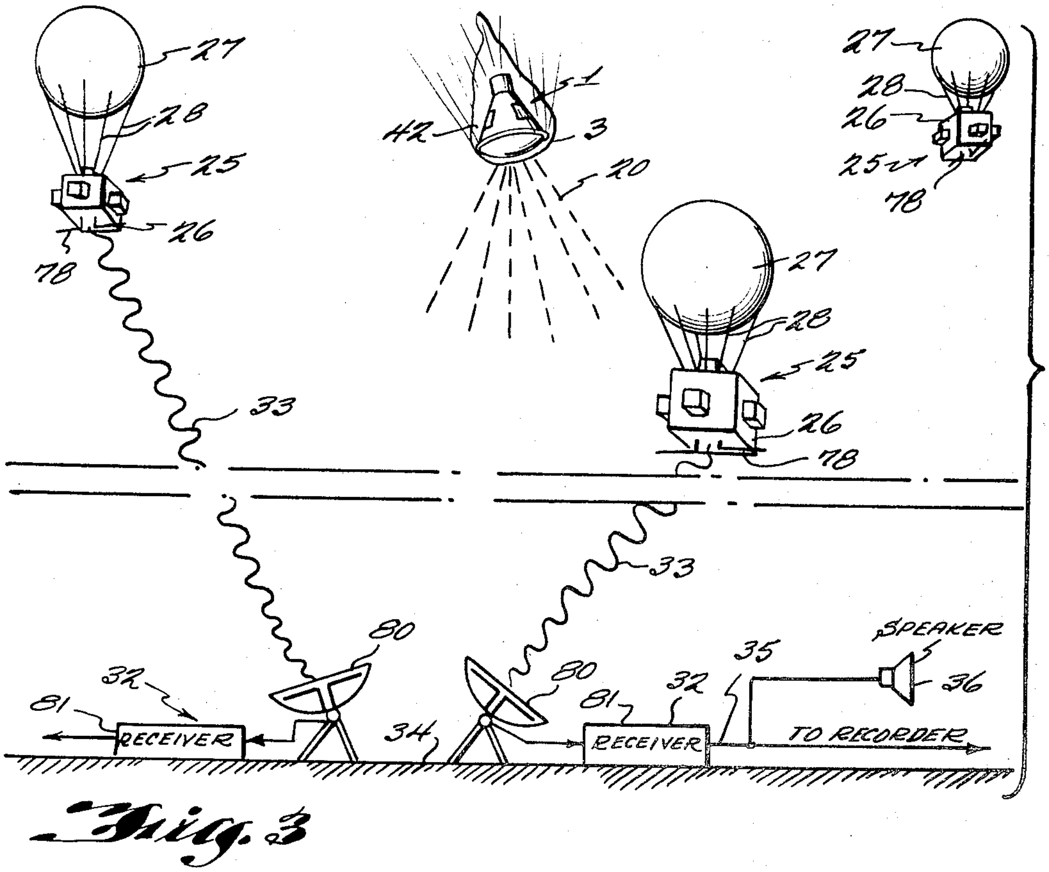
FIG. 3 is a pictorial presentation of one form of communications system in accordance with the present invention.

The relay means can be supported high in the atmosphere at 100,000 to 60,000 feet, for example, to intercept the X-ray beam 20. In FIG. 3 the relay means comprises a number of relay stations 25, each including a housing 26 supported in space by a balloon 27 connected by cables 28. Other support means can be used, but a balloon can be sent up to stay at approximately one altitude and by controlling the volume and pressure of the gas filling and is an inexpensive way of getting up the airborne relay means. The relay stations 25 are disposed at various altitudes around the planned reentry area to insure that at least one of the relay stations 25 will receive the X-ray beam 20 at all times during reentry.

Figure 7:
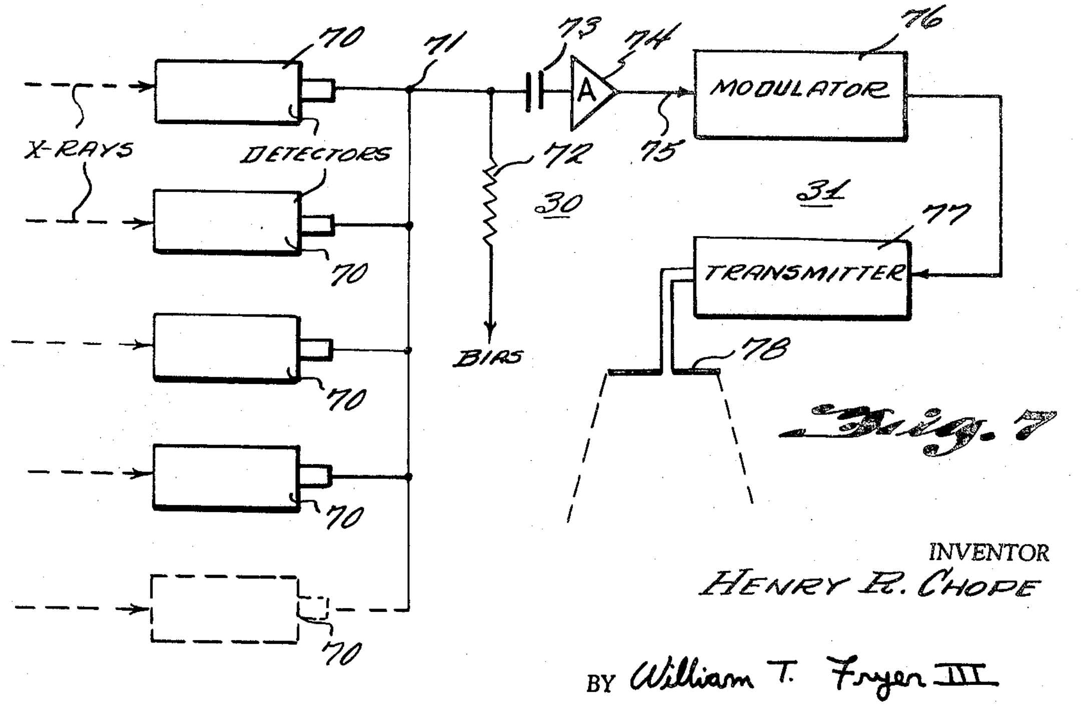
FIG. 7 is a circuit diagram of a suitable system for demodulating an X-ray beam in accordance with the present invention.

Each of relay stations 25 includes a demodulator 30 for demodulating the intelligence signal from the X-ray beam 20 (FIG. 7) and another communications system, for example, a radio transmitting system 31 retransmitting the demodulated intelligence signal via a radio carrier 33 to a radio receiving system 32 on the ground 34. The radio receiving system 32 demodulates the radio carrier 33 and produces a signal at output 35, corresponding to the intelligence signal initiated in space capsule 1, that operates a speaker 36, if it is the voice channel, and is recorded.

The method of the invention can be performed by several types of apparatus. More particularly, in the disclosed embodiment the X-ray transmitter 15 can be of the type described in copending application Ser. No. 125,797, mentioned above and illustrated in FIGS. 5 and 6. X-rays are produced by generator 55 through bombardment of a target 40 of high atomic number material (FIG. 5) with beta rays 44 from a source 41, such as strontium 90 or krypton 85, to form X-ray beam 20. The target 40 and source 41 can be mounted in a small housing 44. The energy level and intensity of the resultant X-ray beam 20 can be controlled in accordance with the teachings of U.S. Patents 2,933,606, to G. Foster and W. Canter, titled "Electromagnetic Radiation Device," issued Apr. 19, 1960, and 2,999,935, to G. Foster, titled "Convertible Radiation Source," issued Sept. 12, 1961.

Figure 5:
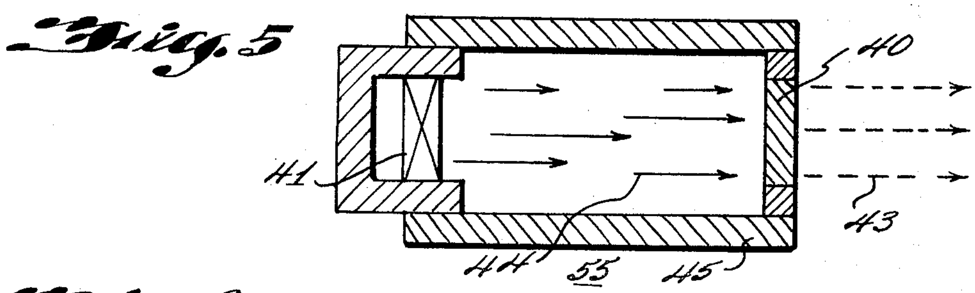
FIG. 5 shows one embodiment of an X-ray generator for the purpose of illustrating how X-rays can be generated.
Figure 6:
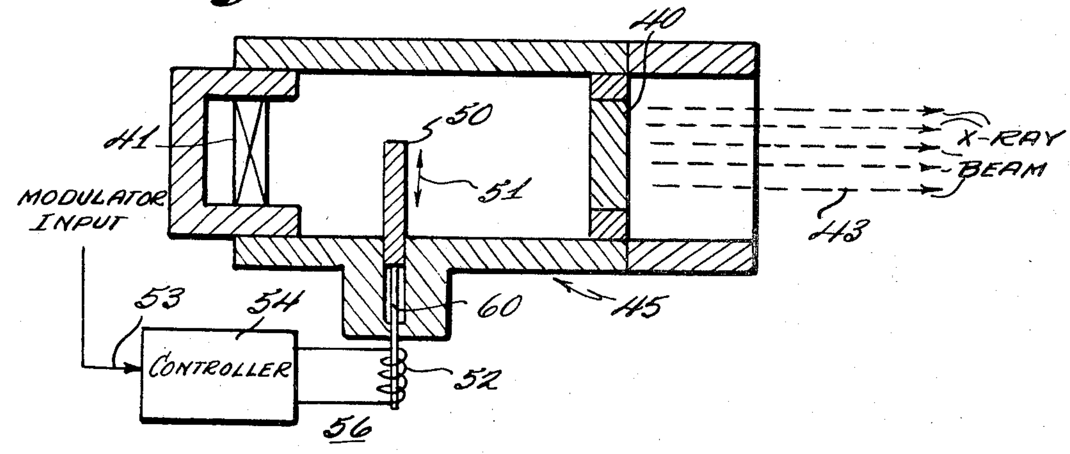
FIG. 6 is one form of X-ray transmitter that modulates the X-rays with an intelligence signal in accordance with the present invention.

The X-ray beam 20 can be used as the carrier for the intelligence signal. The X-ray generator 55 shown in FIG. 5 is combined with a modulator 56 in FIG. 6. The number of beta rays striking target 40 is controlled by a radiation opaque shutter 50 that is slidably mounted in housing 45 to move in the direection indicated by arrow 51, across the path between source 41 and target 40. The position of shutter 50 is controlled by an armature 60 connected thereto and a solenoid 52 in response to a signal at the input 53 of a controller 54. The controller 54 receives a signal, such as a voltage with amplitude proportional to an intelligence signal, and varies the shutter position in proportion to the amplitude of the voltage. The shutter 50 can be a lightweight synthetic material to provide a fast, responsive modulation of the beta rays striking target 40, and, consequently, reliably modulate the X-ray beam 20. Any number of other designs for X-ray transmitter 15 can be utilized in the present invention, such as described in my copending application Ser. No. 125,797 mentioned above.

Figure 4:
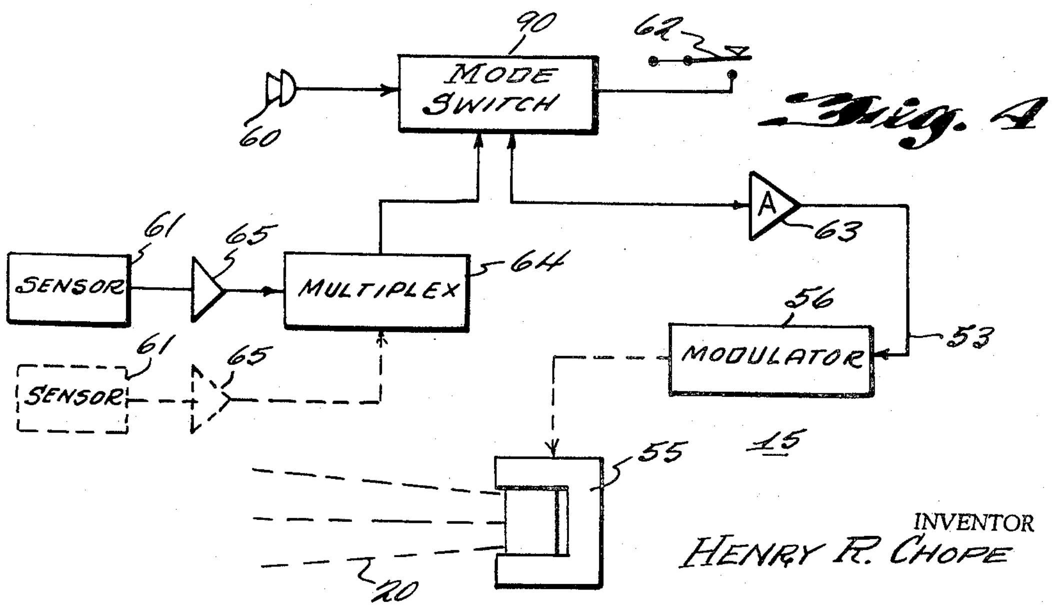
FIG. 4 is block diagram of one suitable system for modulation of the X-ray transmitter with one or more of several intelligence signals.

The general arrangement of the X-ray transmitter 15 and the several sources for an intelligence signal in a space capsule 1 are showin in FIG. 4. These are the voice channel, represented by the microphone 60, and the various measuring instruments on board, represented by the sensors 61, and a pulse code sending capability, represented by the telegraph key 62. Each of the microphone 60, sensors 61, and telegraph key 62 can be separately connected to the input 53 of modulator 56 through a conventional amplifier 63 by a mode switch 90 located on the astronaut's instrument panel 18. The sensors 61 can be coupled to a conventional multiplex unit 64 through separate amplifiers 65 to maximize the amount of data transmitted, as by using a time sharing technique. The intelligence signal from the telegraph source 62 pulses the X-ray beam 20 on and off and is a very reliable form of modulation.

The modulated X-ray beam 20 is received at one or more of the relay stations 25 by a demodulator 30 (FIG. 7), which comprises X-ray detectors 70, such as scintillator and photo-multiplier units, or ionization chambers, disposed on the sides of relay station housing 26. A large number of detectors 20 can be used on each side to increase the signal-to-noise ratio, and detectors 25 can be connected in parallel at a common point 71 to develop a voltage across a resistor 72. A bias voltage can be applied to the opposite end of resistor 72. The AC variation of the voltage across resistor 72 is coupled through capacitor 73 and AC amplifier 74 to the input 75 of a conventional radio-transmitter modulator 76, such as an AM modulator or a single side band modulator forming part of the radio transmitting system 31. The radio transmitting system 31 also includes a conventional radio frequency transmitter 77 that is modulated by a modulator 76 and delivers its power output to an antenna 78. The antenna 78 is mounted on the outside of relay station housing 26 (FIG. 3) and the remainder of radio transmitting system 31 is preferably disposed with housing 26.

The relay station demodulator 30 strips the intelligence signal off of the modulated X-ray beam 20, whether it be a pulse modulation such as Morse code, or an amplitude or intensity modulation. The intelligence signal is coupled to radio transmitting system 31, and retransmitted to radio receiving system 32 on the ground or at another distant location.

Radio receiving system 32 is of a conventional design determined by the fequency of radio transmitting system 31. A UHF or VHF frequency can be used and the radio receiving system 32 has an appropriate antenna 80 coupled to a receiver 81 that demodulates the radio frequency signal received in accordance with the type of modulation used to produce at output 35 the intelligence signal originating in the space capsule 1. The antenna for each of the receiving systems 32 can be directive, continuously pointing to the respective relay station 25 and different carrier frequencies can be used for each relay station 25.

It can be seen that the present invention overcomes significant problems, especially the communications during reentry. The distance between ground station and the reentry location is not critical and a substantial area at the planned reentry location can be set up, at a moderate relative cost, to establish reentry communications from the space vehicle.

As pointed out previously, the apparatus for practicing the method of my invention can take several forms. For example, other types of support means can be used to maintain the relay stations airborne, such as high altitude airplanes. Various components of the apparatus disclosed can be modified or replaced by other conventional apparatus without departing from the present invention. The disclosed embodiment of apparatus has unique features that make it especially practical for performing the method of the present invention. The appended claims define the scope of the invention with it understood that equivalents apparent to one skilled in the art after reading this description are also covered.

I claim:

1. A method of communications between a space vehicle and a planet during reentry into the atmosphere, comprising the steps of:

disposing an X-ray transmitter in said space vehicle,
radiating an X-ray beam from said space vehicle in the direction of the planet during re entry,
modulating said X-ray transmitter with an intelligence signal,
deploying at least one airborne station for receiving the modulated X-ray beam transmitted from said space vehicle and retransmitting said intelligence signal to the planet by another communications means.

2. The method, as described in claim 1, wherein:
several airborne stations are deployed around the planned area of reentry.

3. A method of communications through a highly dense region of ionized gas to a distant location, comprising the steps of:

passing a carrier beam of X-radiation through said region during re-entry, modulating said carrier beam before transmission through said region with an intelligence signal, receiving said modulated carrier beam after passing through said region at an intermediate location and removing the intelligence from said carrier beam, transmitting said removed intelligence to said distant point via another communications means.

4. The method, as described in claim 3, wherein:

said highly dense region of ionized gas is the plasma sheath that surrounds a space vehicle during re-entry into the atmosphere of a planet, each of said receiving, removing of intelligence and transmitting takes place above the planet during re-entry, and said distant location is on said planet.

5. The method, as described in claim 3, wherein:

said another communications means comprises a radio transmitting system at said intermediate location and a radio receiving system at said distant location.

References Cited

UNITED STATES PATENTS

| | | | |
|---|---|---|---|
| 2,598,064 | 5/1952 | Lindenblad | 325—4 |
| 3,030,500 | 4/1962 | Katzin | 325—4 |
| 3,123,714 | 3/1964 | Chope | 250—199 |
| 3,176,227 | 3/1965 | Bender | 325—65 |
| 3,176,228 | 3/1965 | Phillips et al. | 325—65 |
| 3,191,122 | 6/1965 | Hussey | 325—4 |

ROBERT L. GRIFFIN, *Primary Examiner.*

A. MAYER, *Assistant Examiner.*